May 4, 1926.                                                1,583,679
C. I. ELKINS
TRAP
Filed Jan. 8, 1926                            2 Sheets-Sheet 1
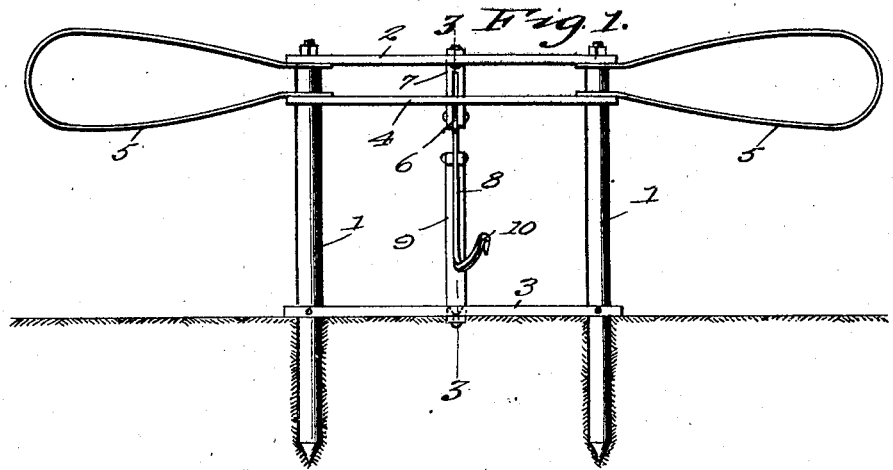
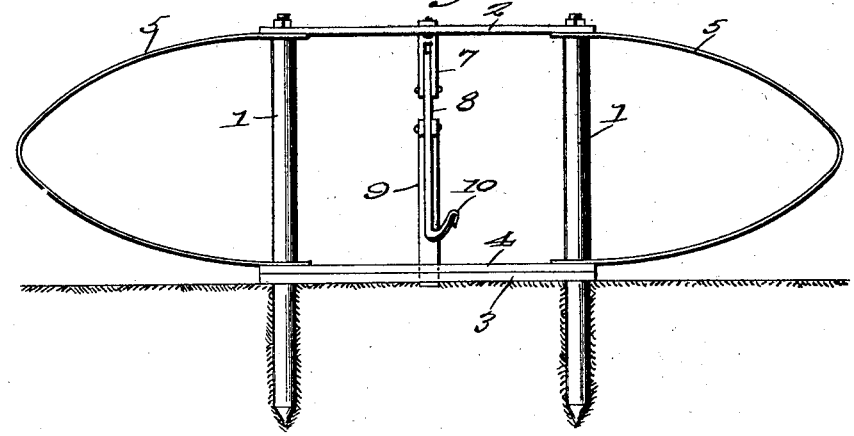
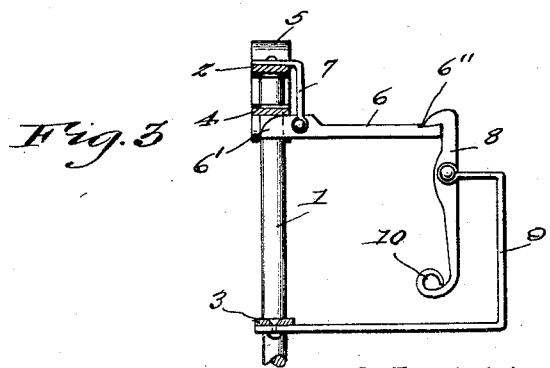
C. I. Elkins
INVENTOR May 4, 1926.
C. I. ELKINS
1,583,679
TRAP
Filed Jan. 8, 1926
2 Sheets-Sheet 2
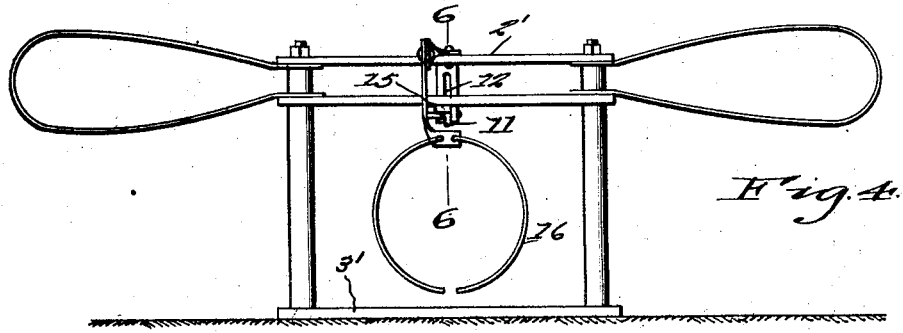
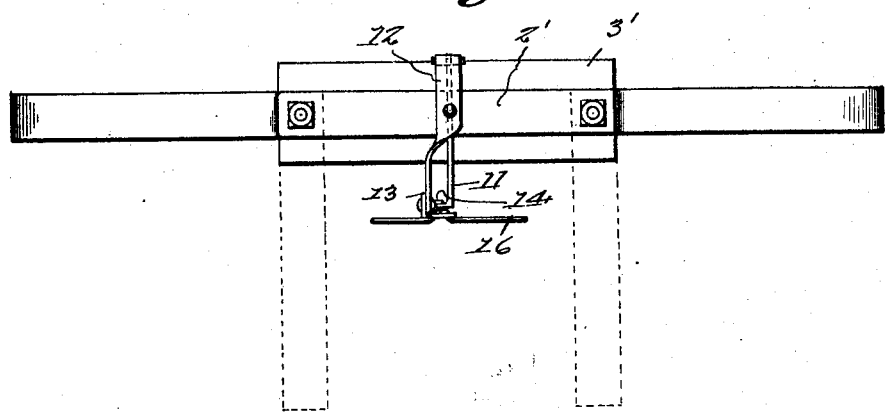
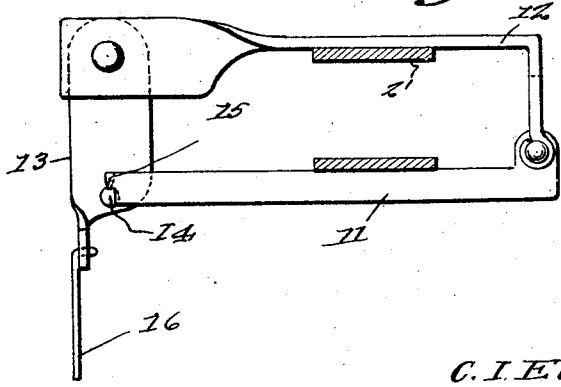

Patented May 4, 1926.

1,583,679

UNITED STATES PATENT OFFICE.

CHARLES I. ELKINS, OF HOULTON, MAINE.

TRAP.

Application filed January 8, 1926. Serial No. 80,042.

*To all whom it may concern:*

Be it known that I, CHARLES I. ELKINS, a citizen of the United States, residing at Houlton, in the county of Aroostook and State of Maine, have invented new and useful Improvements in Traps, of which the following is a specification.

This invention relates to traps, the general object of the invention being to provide means whereby the trap will kill the animal caught at once and will not injure the fur, and one which can be manufactured to sell at low cost and will be easy of operation.

Another object of the invention is to make the device capable of being used to catch bait-taking or non-bait-taking animals.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation showing the trap set.

Figure 2 is a similar view showing the trap sprung.

Figure 3 is a section on line 3—3 of Figure 1.

Figure 4 is a view similar to Figure 1, but showing a modification.

Figure 5 is a plan view of the modification.

Figure 6 is a section on line 6—6 of Figure 4.

In these views, 1 indicates a pair of rods having sharpened ends so that they can be driven into the ground. A top plate 2 is connected with the upper ends of the rods and a bottom plate 3 is connected with the lower portions so that when the rods are driven into the ground, this plate 3 will engage the surface of the ground. The rods may terminate at the plate 3 so that this plate will form the base of the trap. This plate 3 also forms a stationary jaw and a plate 4, slidably mounted on the rods, forms the movable jaw. A pair of springs 5 have their ends perforated to receive the rods, and said ends are located between the plates 2 and 4, so that the springs act to hold the jaw 4 against the plate 3 and when said jaw 4 is raised, the springs will be compressed, as shown in Figure 1. This jaw 4 is held in raised position by the trigger 6 which is pivotally connected to a bracket 7 which is fastened to the center of the top plate 2 and has a rounded end 6' adapted to engage the under surface of the jaw 4 when the trigger is held in horizontal position by means of the trip 8 which is pivoted to the bracket 9 fastened to the bottom plate 3, said trip engaging a notch 6'' in the outer end of the trigger 6 and having a bait holding part 10 at its lower end.

From the foregoing, it will be seen that when an animal attempts to reach the bait, it will pass between the jaws 3 and 4, and as it pulls upon the bait, the trip will be swung on its pivot and thus release the trigger so that the springs 5 will throw the jaw 4 downwardly and thus catch the animal between itself and the jaw 3. The jaws are so formed that the fur of the animal will not be damaged and the animal will be almost instantly killed.

When the trap is to be used for catching animals that cannot be caught by the use of bait, I form the trap as shown in Figures 4, 5 and 6. In this case, the trigger 11 is pivoted to a bracket 12 which has a central part fastened to the center of the top bar 2' of the trap and the trip 13 is pivoted to the other end of the bracket and carries a pin 14 which is adapted to be engaged by a lip 15 on the end of the trigger 11. A ring 16 is carried by the trip and the parts are so arranged that when the trap is placed in the runway of an animal, the animal will have to pass through the ring in order to continue along the runway and as he attempts to pass through, he will swing the trip 13 upon its pivot and thus release the trigger which will permit the springs to throw the movable jaw downwardly and thus catch the animal.

Figure 4 shows the rods, with their pointed ends omitted and with the plate 3' forming the base of the trap.

The springs are movably mounted upon the posts so that they can be moved to the dotted line position shown in Figure 5, when desired or necessary. This will permit the trap to be placed close to the mouth of a burrow or runways where it is difficult to place the trap with its springs extended.

Thus I have produced a simple and inexpensive trap which is similar to the well known "dead fall" and which will catch animals without injuring the fur and which can be used with or without bait, as desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap of the class described, comprising a pair of rods, upper and lower plates fastened to the rods, the lower plate forming a base and a stationary jaw, a third plate slidably mounted on the rods and forming a movable jaw, springs on the rods and acting to hold the movable jaw against the stationary jaw, a trigger connected with the upper plate for holding the movable jaw in raised position and a trip pivoted to a part of the trap for holding the trigger under the jaw.

2. A trap of the class described, comprising a pair of rods, upper and lower plates connected with the rods, the lower plate forming a base and a stationary jaw, a third plate slidably mounted on the rods and forming a movable jaw, leaf springs having perforations therein for receiving the rods and acting to hold the movable jaw against the stationary jaw, a bracket on the top plate, a trigger pivoted to the bracket, a trip pivoted to a part of the trap and arranged to hold the trigger in holding position and bait holding means on the trip.

3. A trap of the class described, comprising a pair of rods, upper and lower plates connected with the rods, the lower plate forming a stationary jaw and a base, a third plate slidably mounted on the rods and forming a movable jaw, leaf springs having perforations therein for receiving the rods and acting to hold the movable jaw against the stationary jaw, a bracket on the top plate, a trigger pivoted to the bracket, a trip pivoted to a part of the trap and arranged to hold the trigger in holding position and a loop connected with the trip.

In testimony whereof I affix my signature.

CHARLES I. ELKINS.